INVENTOR.
JARING VANDER VEEN
BY
William N. Antonis
ATTORNEY

United States Patent Office 3,368,653
Patented Feb. 13, 1968

3,368,653
AIRCRAFT BRAKE DAMPER MECHANISM
Jaring Vander Veen, South Bend, Ind., assignor to The
Bendix Corporation, a corporation of Delaware
Filed May 26, 1966, Ser. No. 553,178
9 Claims. (Cl. 188—218)

ABSTRACT OF THE DISCLOSURE

The following relates to a brake damper mechanism for use in conjunction with an aircraft wheel and brake assembly. The damper mechanism is interposed between fixed mounting means, such as the wheel axle and an axle flange, and non-rotatable break means, such as the brake stators, the torque tube to which the stators are attached, and a torque tube flange, for absorbing vibratory energy and substantially eliminating torsional vibrations induced in the non-rotatable brake means during braking. The damper mechanism includes a plurality of stacked Belleville washers which when compressed absorb energy as a result of the friction occurring between the contacting faces of the washers.

During braking of an aircraft, "negative damping" is produced by the sliding contact between the brake linings and adjacent brake bearing elements, on in other words, between the brake stators and rotors. The production of such negative damping can excite vibration modes within the brakes per se, as well as the structural modes of aircraft landing gear-brake systems. Such vibrations not only create an excessive amount of noise, but also reduce the life of the brake lining and cause structural fatigue of the landing gear components.

Accordingly, it is an object of this invention to provide a brake damper mechanism which is designed to counteract negative damping.

In other words, it is an object of this invention to mount a brake damper mechanism between the brake per se and the structure mounting flanges which provides sufficient positive damping to appreciably reduce or completely eliminate the vibrations which arise upon the occurrence of negative damping.

Another object of this invention is to damp the vibrations of the primary torsional mode which consists of torsional windup of the brake non-rotating parts on the strut mounting structure. Such damping will result in a reduction in coupling with other strut structural modes.

An important object of this invention is to provide a resilient torque path between the stationary parts of the brake and the strut mounting of the brake by inserting a brake damper capsule therebetween.

More specifically, it is an object of this invention to provide a damper mechanism between two separated points in the aforementioned torque path which permits a relatively high deflection between the two separated points in the torque path, said damper mechanism comprising a plurality of stacked Belleville washers which when compressed absorb energy as a result of the friction occurring between the contacting faces of the washers.

A further object of this invention is to provide a damping mechanism for use in connection with an aircraft wheel and brake assembly which utilizes a plurality of stacked Belleville washers for achieving high damping over a large range of temperature and/or frequency conditions.

A significant object of this invention is to provide a brake damper mechanism for use in connection with an aircraft wheel and brake assembly which will permit the use of longer wearing linings, thereby resulting in a more economical braking system.

The above and other objects and features of this invention will be apparent from the following description taken in connection with the accompanying drawings which form a part of this disclosure and in which.

Figure 1:
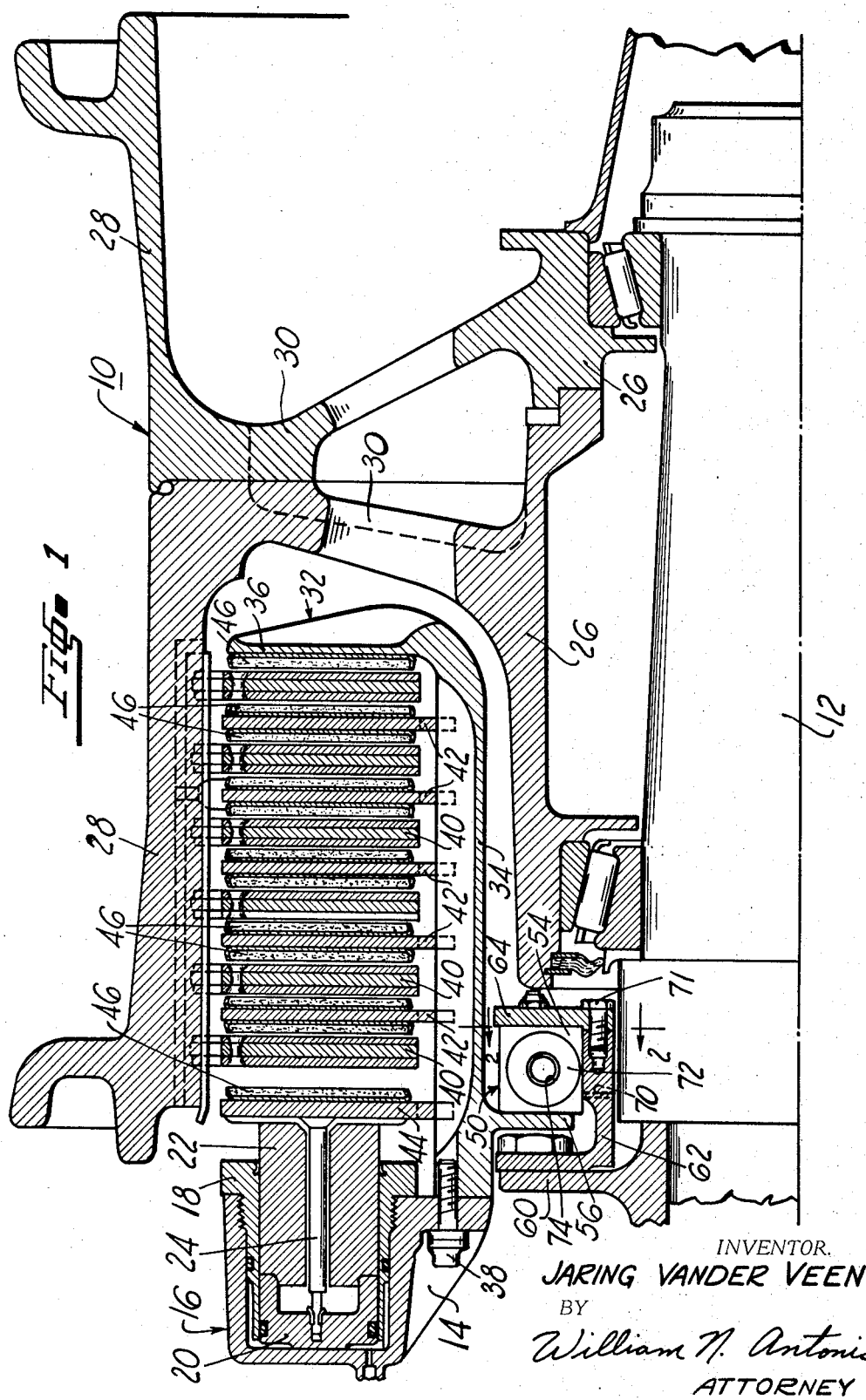
FIGURE 1 is a sectional view of one-half of a symmetrical wheel and brake assembly which incorporates the invention.
Figure 2:
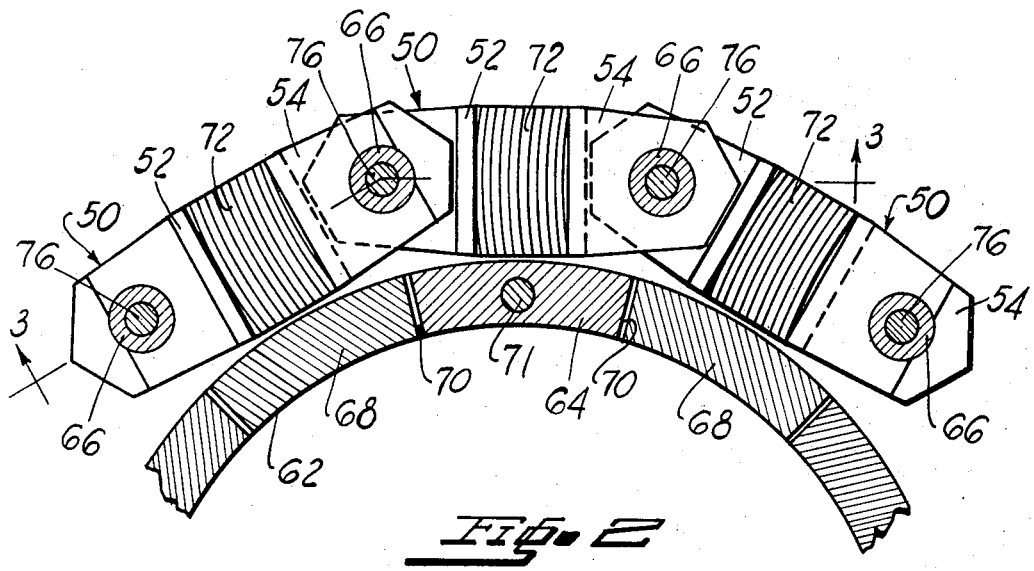
FIGURE 2 is a sectional view taken substantially along line 2—2 of FIGURE 1.
Figure 3:
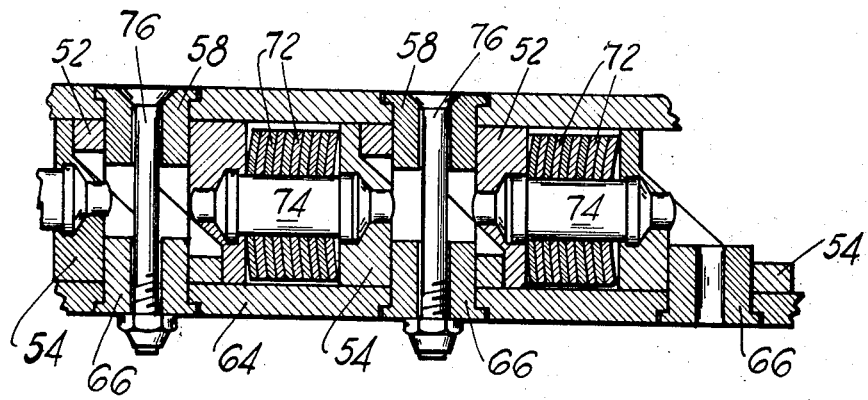
FIGURE 3 is a sectional view taken substantially along line 3—3 of FIGURE 2.

Referring to FIGURE 1, it will be seen that the wheel and brake assembly which is illustrated includes a wheel 10 rotatably mounted on a stationary axle 12 and a stationary carrier member 14 which is connected to the axle through any suitable means, such as by a direct bolt connection (not shown). The construction for rotatably mounting the wheel 10 to axle 12 and fixing the stationary carrier 14 to the axle 12 is well known, and a description thereof is not deemed to be necessary. The carrier contains a plurality of fluid motors 16, each of which includes a protective sleeve 18 threadedly secured thereto and a piston 20 located and slidable in said sleeve. A block of insulating material 22 is secured to the head end of the piston by a threaded pin 24 for protecting the hydraulic brake fluid from the heat generated during braking. The wheel 10 which is formed of two sections fastened together by a plurality of bolts (not shown), includes a hub portion 26 and a rim portion 28 interconnected by a plurality of spokes 30 which define a plurality of windows therebetween through which air may pass for cooling. A torque tube 32, which includes a sleeve 34 and an annular backing plate flange 36, is fixedly secured to the carrier member 14 by a plurality of circumferentially spaced bolts 38.

The brake which is illustrated is of the disc type and includes a plurality of interleaved rotors 40 which are splined to and are rotated by the aircraft wheel 10, and stators 42 which are splined to sleeve 34 of the torque tube 32. Both the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motors 16, forces the rotors 40 and stators 42 against each other upon actuation of the motors by thrusting at one side of the stack and biasing the entire stack against the backing plate 36. Pressure plate 44, each of the stators 42, and the backing plate have friction material lining 46 provided thereon. The lining is formed by a plurality of friction pads located in cups which are suitably secured to the associated mounting structure. Neither the composition, arrangement, nor mounting of the friction segments forms an essential part of the present invention.

It will be seen from the drawing that the brake damper is formed of a plurality of damping mechanisms indicated generally by the numeral 50. Each of the damping mechanisms includes two identical brackets 52 and 54, one of which is suitably attached directly to a torque tube flange 56 through means which includes a bushing 58, and the other of which is suitably attached to an axle flange 60 through means which includes an inner annular plate 62, an outer annular plate 64, and a bushing 66. A plurality of lugs 68 formed on the inner annular plate are received in a plurality of slots 70 formed on the outer annular plate, said plates being held together by a plurality of bolts 71 to form a U-shaped member for containing the damping mechanisms. It will be understood that the U-shaped member formed by the inner and outer plates is not an essential part of the invention and that, if desired, and the wheel and brake construction permits, the bracket 54 could be connected directly to the axle flange 60 through means of bushing 66. All that is necessary is to provide sufficient space between the torque tube and axle flanges for containing the damping mechanisms.

Located between each pair of brackets 52 and 54 are a plurality of Belleville washers 72 in registered face-to-face contact which are maintained in axial alignment through means of an internal cylindrical guide pin 74. Although bolts 76 are shown as extending through oppositely disposed and axially aligned bushings 58 and 66 for maintaining the bushings in place, it should be understood that these bolts are not torque taking members and that only the bushings are utilized to withstand the torque. Furhermore, it should be understood that each damping mechanism 50 functions independently of the other damping mechanisms and that the bolt 76, although passing through bushing 58 of one damping mechanism and bushing 66 of the next adjacent damping mechanism, does not affect the independent operation of the adjacent mechanisms.

Operation of the damper mechanism will be as follows: During braking, torsional windup of the nonrotating parts of the brake and supporting structure will occur and will be accompanied by detrimental torsional vibrations. During such braking the primary torsional mode of the nonrotating or stationary parts, which comprises an inertial system made up of the stators 42, the torque tube 32 (including sleeve 34 and backing plate 36), carrier member 14, pressure plate 44, and an elastic system made up of the inherent elasticity of the aforementioned parts plus primarily the torsional elasticity of the damping mechanisms 50 and the elasticity of the torque train from the brake mounting or axle flange 60 to the verticle centerline of the aircraft landing gear strut, is acted upon by brake torque from the rotor-stator interface. This torque, in addition to being an approximately constant torque level, also has the feature that at certain combinations of mean stator-rotor rotational velocity, interface temperatures, previous history of braking, and applied brake pressure (from fluid motors 16), it will show an instantaneous velocity sensitivity whereby a decrease in rotational speed will bring about a slight increase in torque level. This feature, which has previously been referred to as negative damping, can, in the absence of sufficient positive damping within the structural elements of the elastic torque train, cause any small vibratory or noise type disturbance (which disturbances are always present) to grow to a large oscillation of the squeal mode.

Because of the attachment of the plurality of damping mechanisms 50 to the torque tube flange 56 and axle flange 60, these damping mechanisms will absorb a predetermined amount of vibratory energy and will substantially eliminate detrimental torsional vibrations. Thus, upon oscillatory twisting of the primary torsional mode, passage of a torque through the elastic torque path provided in part by the damping mechanisms 50 causes brackets 52 and 54 of each mechanism to move towards each other and compress the stack of Belleville washers 72 confined therebetween. Such compression of these washers causes absorption of energy through means of the friction between the contacting faces of the adjacent washers. The amount of energy absorption can be varied by varying the number of damping mechanisms, the number of Belleville washers per damping mechanism, the washer size, and the frictional characteristics of the washers. In any event, compression of the Belleville washer stacks will provide sufficient positive damping to counteract the negative damping produced during braking and appreciably reduce or completely eliminate the undesirable and detrimental torsional vibrations produced by such negative damping. Although the relative movement between each set of damper brackets 52 and 54 will amount to only fifty or sixty thousandths of an inch, such movement amounts to a relatively high deflection insofar as the torsional windup is concerned and is sufficient to accomplish the purpose for which it is intended.

The several advantages which flow from this invention are believed to be obvious from the above description, and other advantages may suggest themselves to those who are familiar with the art to which this invention relates.

Furthermore, although this invention has been described in connection with certain specific embodiments, it will be obvious to those skilled in the art that various changes may be made in the form, structure, and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. In an aircraft wheel and brake assembly having fixed mounting means, rotatable brake means, and non-rotatable brake means operatively connected to said fixed mounting means and frictionally engaging said rotatable brake means, said non-rotatable brake means having torsional vibrations induced therein upon frictional engagement with said rotatable brake means, frictional damping means located between and operatively connected to said fixed mounting means and said non-rotatable brake means for absorbing vibratory energy and substantially elimininating said torsional vibrations, said damping means comprising a plurality of damping mechanisms each of which includes a first member fixedly connected to said fixed mounting means, a second member fixedly connected to said non-rotatable brake means, and a plurality of stacked surface contacting layers operatively connected to and confined between said first and second members, said layers being caused to frictionally slide against one another upon relative movement between said first and second members.

2. The combination defined in claim 1, wherein said layers are formed of a plurality of washer-like elements in registered face-to-face contact.

3. The combination defined in claim 2, wherein said washer-like elements are Belleville washers.

4. The combination defined in claim 3, wherein frictional engagement of said rotatable and nonrotatable brake means causes compression of said Belleville washers upon movement of one of said members towards the other of said members.

5. The combination defined in claim 4, wherein said damping means includes guide means operatively connected to said first and second members for maintaining said washers in proper alignment and permitting movement of said members towards each other.

6. The combination defined in claim 5, wherein said guide means is a cylindrical pin located within said washers and operatively connected to said first and second members.

7. The combination defined in claim 6, wherein said fixed mounting means comprises a wheel axle and an axle flange, said rotatable brake means comprises a wheel and brake rotors attached thereto, and said nonrotatable brake means comprises brake stators, a torque tube to which the stators are attached, and a torque tube flange.

8. The combination defined in claim 7, wherein said first member is fixedly connected to said axle flange, and said second member is connected to said torque tube flange.

9. The combination defined in claim 8, wherein said plurality of damping mechanisms are located around the periphery of said axle.

References Cited
UNITED STATES PATENTS 2,197,583   4/1940   Koeppen et al. ____ 188—218 X DUANE A. REGER, *Primary Examiner.*